No. 880,953. PATENTED MAR. 3, 1908.
R. E. ZAGER.
TRACTION VEHICLE.
APPLICATION FILED MAY 10, 1907.
4 SHEETS—SHEET 1.
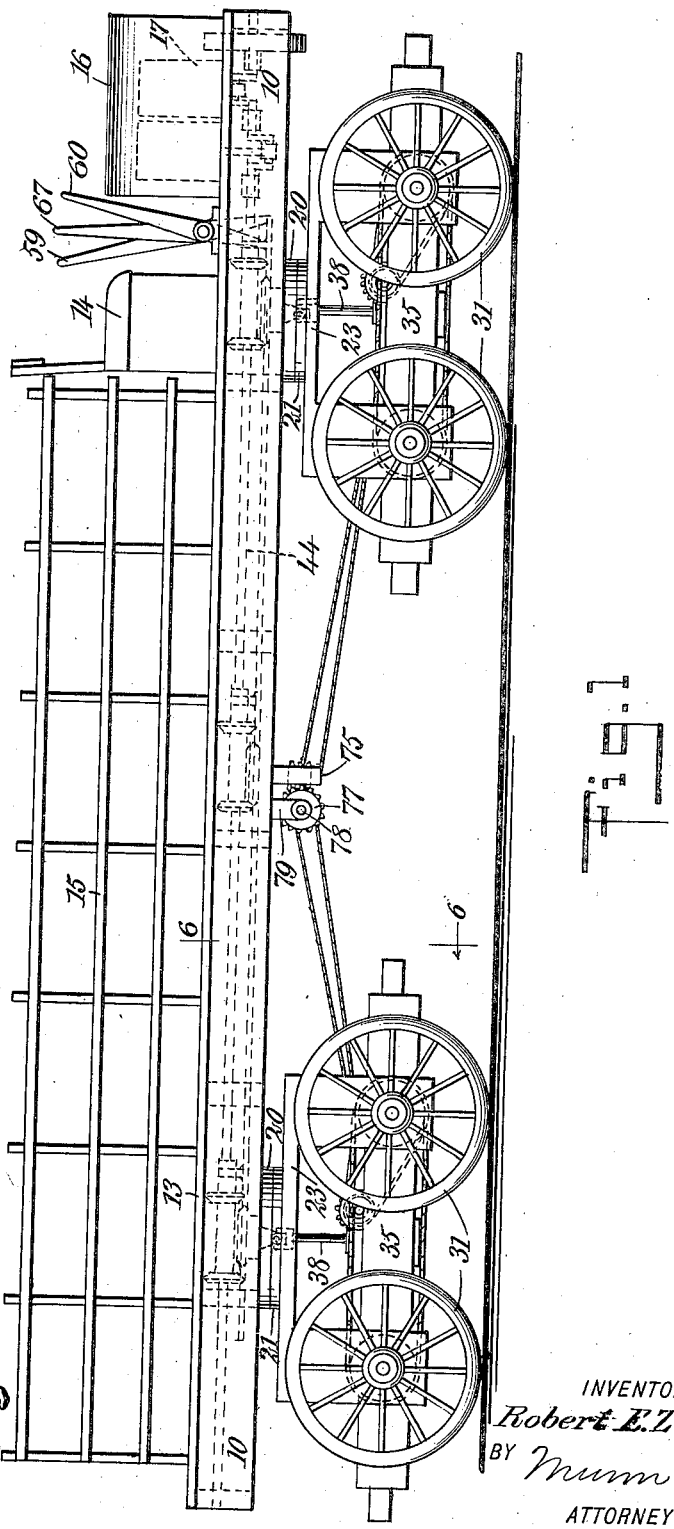
WITNESSES
INVENTOR
Robert E. Zager
BY Munn & Co.
ATTORNEYS.

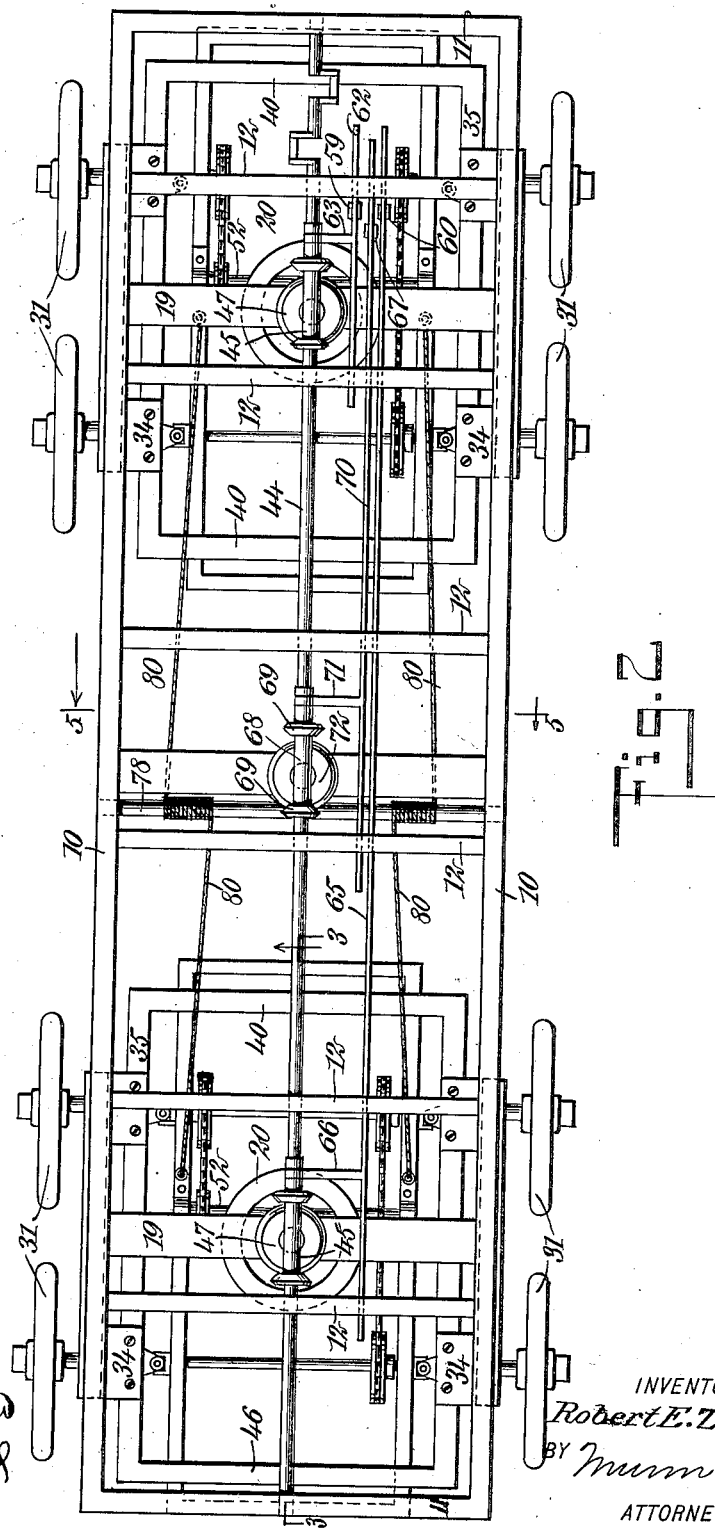

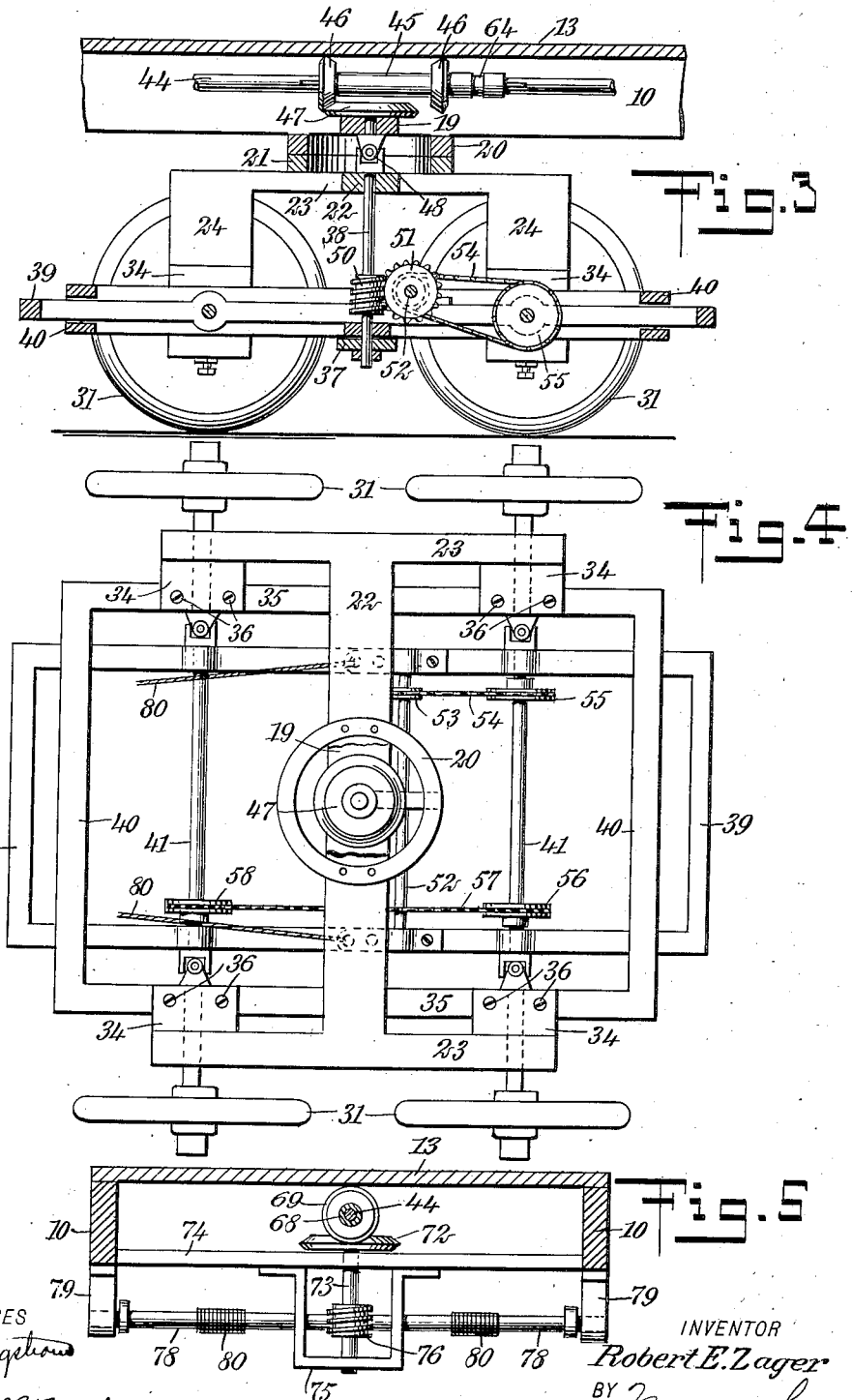

No. 880,953.  
R. E. ZAGER.  
TRACTION VEHICLE.  
APPLICATION FILED MAY 10, 1907.  
PATENTED MAR. 3, 1908.  
4 SHEETS—SHEET 4.
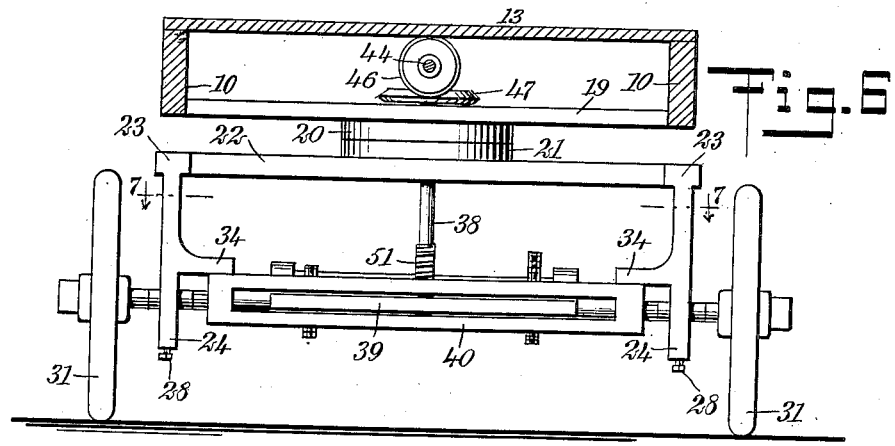
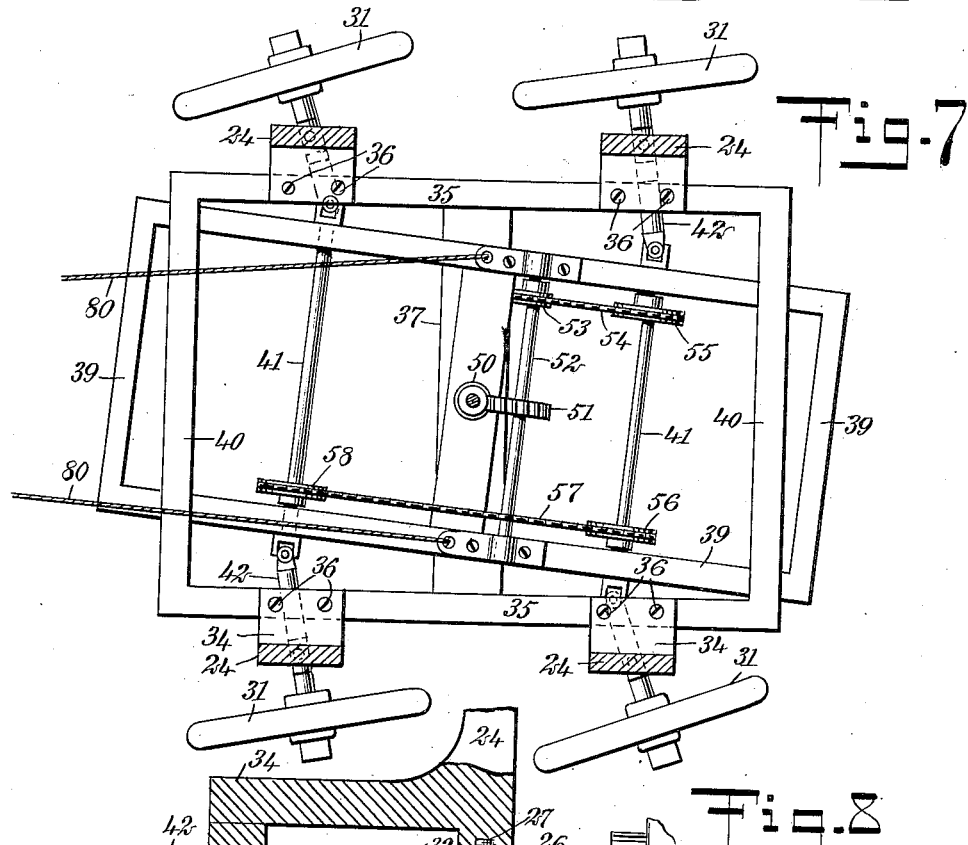
WITNESSES  
INVENTOR  
Robert E. Zager  
BY  
ATTORNEYS

UNITED STATES PATENT OFFICE.

ROBERT E. ZAGER, OF BRANSCOMB, CALIFORNIA.

TRACTION-VEHICLE.

No. 880,953.

Specification of Letters Patent.

Patented March 3, 1908.

Application filed May 10, 1907. Serial No. 372,894.

*To all whom it may concern:*

Be it known that I, ROBERT E. ZAGER, a citizen of the United States, and a resident of Branscomb, in the county of Mendocino and State of California, have invented a new and Improved Traction-Vehicle, of which the following is a full, clear, and exact description.

My invention relates to improvements in traction vehicles, an object being to provide a vehicle of this class in which the vehicle body is mounted on a plurality of swivel trucks which may be propelled singly or collectively by a single engine.

Another object is to provide a novel steering gear whereby all the wheels may be simultaneously swiveled without swiveling the trucks, and whereby the trucks may be swiveled as well, if desired.

The invention consists in the novel construction and combination of the several parts as will be hereinafter fully set forth and pointed out in the claims.

Reference is to be had to the accompanying drawings forming a part of this specification in which similar characters of reference indicate corresponding parts in all the views.

Figure 1 is a side elevation of the traction vehicle; Fig. 2 is a plan view with the bed of the vehicle removed; Fig. 3 is a longitudinal section of a portion of the vehicle taken on line 3—3 of Fig. 2; Fig. 4 is a plan view of one of the trucks employed in my traction vehicle; Fig. 5 shows a cross section of the traction vehicle taken on line 5—5 of Fig. 2; Fig. 6 shows a cross section of the traction vehicle taken on the line 6—6 of Fig. 1; Fig. 7 represents a section of one of the trucks taken on line 7—7 of Fig. 6 and shows the positions of the wheels when turned with respect to the body of the truck; and Fig. 8 is a sectional view showing a detail of one of the axles on which the wheels are mounted.

The frame of the traction vehicle is rectangular in form consisting of the side beams 10 and the end beams 11. A series of cross beams 12 connect and brace the side beams. On the frame a bed 13 is supported. The vehicle body is provided with a seat 14 and sides 15 which may be of any desired form. At the forward end and covered by a casing 16 is a motor 17 used for propelling the vehicle.

As shown in the drawings, the vehicle body is supported on two swivel trucks, hence, two bolsters 19 are secured to the vehicle frame respectively near the front and rear of the frame. The upper member 20 of a fifth wheel is secured to each bolster, while the lower members 21 of the fifth wheels are carried by the truck bolsters 22.

The front and rear trucks are of similar construction and the following description of one will apply equally as well to the other. The truck bolster 22 is supported at each end on a pair of opposite brackets 23, each bracket being formed with two downwardly extending members 24. The lower end of each member 24 is provided with an opening 25 (Fig. 8) in which a sleeve 26 is swiveled on a vertical axis, being engaged by pin 27 fitted into the upper wall of the opening 25 and a set screw 28, which is threaded through the bottom of the member 24. A jam nut 29 on the set screw serves to lock the set screw at the proper adjustment. Journaled in each sleeve 26 is an axle 30, on the outer end of which a wheel 31 is rigidly mounted. A collar 32 is secured on each axle 30 by a pin 33, and bears against the inner face of the sleeve.

Each member 24 is formed with a step 34 extending inwardly and to these steps a rectangular frame 35 is secured by screws 36. This frame is provided with a central cross beam 37. Journaled in the cross beam 37 and the bolster 22 is a king pin 38, and swiveled on the king pin, within the frame 35 is a swivel frame 39. This frame 39, which is preferably rectangular, is narrower and longer than the frame 35 and projects through slots in the end walls 40 of the latter frame. The end walls of these slots serve as stops to limit the swiveling motion of the frame 39.

Journaled in the swivel frame 39 with their ends projecting through the side members of said frame, are a pair of shafts 41. These shafts are so positioned that when the swivel frame 39 and the wheels 31 lie in normal parallel relation with frame 35, as shown in Fig. 4, the shafts will be in alinement respectively with the axles of the opposite wheels 31. Connected to each end of each shaft 41 by a universal joint, is a sleeve 42 provided with an angular bore 43. These sleeves are adapted respectively to receive the inner ends of the axles 30 which are formed with angular faces to fit into the bores 43. The axles will thus be caused to rotate with the sleeves 42, but will be free to slide endwise therein.

The motor 17 which propels the vehicle operates to drive a main shaft 44, which extends the full length of the vehicle, being journaled in the end beams 11 and cross beams 12. The method of applying the power of the main shaft to the wheels is the same for both trucks, and hence, to avoid unnecessary duplication the following description of said method will be confined to the mechanism of one of the trucks. It should be clearly understood, however, that said mechanism is the same in each truck.

Mounted to slide on the shaft 44 over the bolster 19, is a sleeve 45 which is splined to the shaft 44. This sleeve carries two opposed bevel pinions 46, one at each side of a bevel gear 47 which is journaled in the bolster 19. By moving the sleeve on the shaft in one direction or the other, one or other of the bevel pinions may be brought into mesh with the gear 47, or the sleeve may be moved to such a position that neither pinion engages the gear. The gear 47 is connected by a universal joint coupling 48, with the king pin 38. Mounted on the king pin is a worm 50, which meshes with a gear 51 keyed to a shaft 52. This shaft is journaled in the frame 39 and keyed to the shaft is a sprocket wheel 53. A chain 54 connects the sprocket wheel 53 with a sprocket wheel 55 keyed to the front shaft 41. A second sprocket wheel 56 keyed to said shaft is connected by a chain 57 to a sprocket wheel 58 keyed on the rear shaft 41. The transmission of power from the motor 17 to the wheels 31 may now be readily traced. The shaft 44 turns the king pin through the medium of one of the bevel pinions 46, the bevel gear 47, and the universal coupling 48; the king pin transmits the motion through the worm gear and the sprockets and chains to the two shafts 41, while these shafts convey the motion through the universal joint couplings to the sleeves 42, which have sliding connections with the axles 30 on which the wheels 31 are made fast.

The direction of rotation of the wheels 31 will depend upon which one of the pinions 46 is moved into engagement with the bevel gear 47, and this is governed by a pair of levers 59, and 60, which are located conveniently near the operator's seat 14, one of the levers controlling the mechanism of the front truck, and the other the mechanism of the rear truck. The end of the lever 59 below its fulcrum projects through the bed of the vehicle and engages a bar 62 which is mounted to slide longitudinally in bearings in two of the cross beams 12. This bar carries an arm 63 which is formed with a yoke at the free end, which fits over a reduced portion 64 of the front sleeve 45. Similarly the lower end of the lever 60 is connected to a bar 65, which extends past the rear sleeve 45 and is mounted to slide longitudinally in the cross beams 12. This bar carries an arm 66, formed with a yoke which fits over the reduced portion 64 of the rear sleeve 45. Each operating lever has three positions controlling the action of its respective truck, one for forward propulsion, another for reversing, and a third or intermediate position for disconnecting the driving mechanism of the trucks from the motor, these being all secured by varying the relations of the bevel pinions 46 with respect to the bevel gear 47. As the driving mechanism of the two trucks is separately controllable by the levers, either one, or both of the trucks, may be coupled to the motor, as may be desired.

The steering mechanism of the traction vehicle is driven by the main shaft 44 under control of a lever 67 located near the seat 14. Splined to the shaft 44 near the center of the vehicle, is a sleeve 68 which carries a pair of opposed bevel pinions 69. Connected to the lower end of the steering lever 67 is a bar 70 which is mounted to slide longitudinally in bearings in the cross beams 12. This bar carries an arm 71 formed with a yoke at its free end which engages a reduced portion of the sleeve 69. By operating the lever 67 one or other of the bevel pinion 69 may be moved into engagement with a bevel gear 72 secured to a vertical shaft 73. An intermediate position of the sleeve is also possible, in which neither pinion engages the gear. The shaft is journaled at its upper end in a cross beam 74, secured to the side beams 10, while its lower end has bearing in a U-shaped bracket 75 which is fastened to the cross beam 74. Secured on this shaft is a worm 76 which engages a worm wheel 77 mounted on a shaft 78. The latter is journaled in brackets 79, secured to the frame members 10. Two ropes 80 are wound around the shaft 78 at opposite sides of the worm wheel 77. One end of the rope 80 which lies at the right hand side of the worm wheel extends to the front truck and is attached to the front swivel frame 39 at the right hand side thereof, while the other end of the same rope extends to the rear truck and is attached to the right hand side of the rear swivel frame 39. Similarly, the other rope 80 is connected at opposite ends respectively to the front and rear swivel frames 39 at the left hand side thereof. The ropes are so wound that when the shaft is turned in one direction it will be winding up on the forward length of the right hand rope while paying out the rear length, and will be paying out the forward length of the left hand rope while winding up the rear length, and vice versa. If now, it be desired to turn the vehicle, say to the left, the operator will throw the lever 67 to bring the desired pinion 69 into engagement with the gear 72, thus transmitting rotary power to the shaft 78 and causing it to wind up the forward length of the right hand rope 80, and the rear length of the left-hand rope. This will cause the frames 39 to swivel, their forward ends turning toward the right. The shafts 41 being swung with the swivel frames 39, will move the sleeves 42 on the right hand side toward the rear, and those at the left hand side toward the front. The axles 30 will thus be swiveled, causing the wheels to turn toward the left as shown in Fig. 7. The sliding connections provided between the sleeves 42 and the shafts 30 will permit the latter to adjust themselves to their abnormal position.

As stated above, the end walls of the slots in the members 40 of the frames 35 limit the extent to which the frames 39 may be turned. If, after this limit is reached, the shaft 78 continues to revolve, the frame 39 bearing against the limiting walls of the slots will cause the frames 35 to turn, thus swiveling the entire trucks and permitting the vehicle to make a sharper turn. It will be evident that the swiveling, either of the frames 35 or of the frames 39, will not interfere with the transmission of power to the wheels 31, because this transmission is effected through the king pins 38 on which these frames are pivoted. The universal joint coupling 48 which connects the gears 47 with the king pins 38, allows for all tilting of the trucks due to irregularities in the roadbed.

Having thus described my invention, I claim as new and desire to secure by Letters Patent:

1. In a traction vehicle, a main frame, a king pin revolubly connected thereto, a truck frame swiveled on said king pin and supporting said main frame, traction wheels journaled to said truck frame and having swiveled connection therewith, means for swiveling said wheels with respect to said truck frame, a prime mover on said main frame, a power shaft journaled in said main frame and adapted to be driven by said prime mover, transmission mechanism connected with said power shaft for driving said king pin, means for starting, stopping and reversing the rotation of said king pin, and driving mechanism for transmitting the motion of said king pin to said traction wheels.

2. In a traction vehicle, a main frame, a king pin comprising two members connected together by a universal joint, one of said members being journaled in said main frame, a truck frame swiveled on the other of said members and supporting said main frame, traction wheels journaled to said truck frame and having swiveled connection therewith, means for swiveling said wheels with respect to said truck frame, a prime mover carried on said main frame, transmission mechanism connecting said prime mover with said king pin, and transmission mechanism connecting said king pin with said wheels.

3. In a traction vehicle, a main frame, a king pin revolubly connected therewith, a truck frame swiveled on said king pin and supporting said main frame, traction wheels journaled to said truck frame and having swiveled connection therewith, a prime mover on said main frame, a power shaft journaled in said main frame, transmission mechanism connected with said power shaft for driving said king pin, means for starting, stopping, and reversing the rotation of said king pin, driving mechanism for transmitting the motion of said king pin to said wheels, steering mechanism actuated by said power shaft and adapted initially to swivel said wheels with respect to said truck frame and thereafter to swivel said truck frame with respect to said main frame, and means for starting, stopping, and reversing said steering mechanism.

4. In a traction vehicle, a truck frame, journal sleeves swiveled therein, axles journaled in these sleeves, traction wheels secured on said axles, collars secured on said axles to hold the latter in said journals, a steering frame mounted to swivel in said truck frame, drive-shafts journaled in said steering frame, coupling sleeves coupled by universal joints with the ends of said drive-shafts, said coupling sleeves being formed with angular bores, said axles being formed with angular shanks adapted to slide in said bores and engage said coupling sleeves, and means for swiveling said steering frame so as to turn said wheels at angles with said truck frame.

5. In a traction vehicle, a truck frame, formed with openings at opposite sides thereof, a fixed pin in each opening, an adjustable pin in each opening in opposed relation to said fixed pin, means for locking said adjustable pins at any desired adjustment, a sleeve in each opening, swiveled between the fixed pin and the adjustable pin therein, an axle journaled in each sleeve, a traction wheel secured on the outer end of each axle, a collar secured on each axle, said collars bearing respectively against the inner faces of said sleeves, each axle being formed with an inwardly-extending angular shank, a steering frame, a shaft mounted in said steering frame between each pair of opposed axles, a coupling sleeve on each end of each shaft and connected thereto by a universal joint, each coupling sleeve being formed with an angular bore adapted to receive in sliding engagement said angular shank of an adjacent axle, means for driving said shafts, and means for swiveling said steering frame.

6. In a traction vehicle, a truck frame, journal sleeves mounted to swivel in said frame, axles mounted to rotate in said journal sleeves, traction wheels secured on said axles, a steering frame, shafts supported in said steering frame and respectively connected at opposite ends with said axles, a king pin journaled in said truck frame, said steering frame being mounted to swivel on said king pin between limits on said truck frame, transmission gearing connecting said shaft with said king pin, a vehicle body supported on said truck frame and pivoted on said king pin, a motor supported on said vehicle body, a power shaft driven by said motor, a transmission mechanism in connection with said power shaft for driving or reversing the rotation of said king pin or for disconnecting said king pin from said power shaft, and means for swiveling said steering frame so that initially said wheels will swing to an angle with said truck frame and thereafter said truck frame will be swiveled to an angle with said vehicle body.

7. In a traction vehicle, a main frame, a pair of revoluble king pins connected with said frame, a truck frame swiveled on each king pin, said truck frame supporting said main frame, a motor supported on said main frame, a power shaft journaled in said main frame and driven by said motor, a separate transmission mechanism connected with said power shaft for driving each of said king pins, means for starting, stopping and reversing the rotation of each king pin, a steering frame mounted on each king pin and adapted to swivel between stops on the adjacent truck frame, drive-shafts journaled in each steering frame, transmission gearing connecting each king pin with the drive-shafts in the adjacent steering frame, journal sleeves mounted to swivel in each truck frame on opposite sides thereof, an axle journaled in each sleeve, traction wheels secured on said axles and supporting said truck frame, sliding couplings connecting said axles with said drive-shafts, a steering shaft journaled in said main frame, transmission mechanism connecting said power shaft with said steering shaft, means for starting, stopping and reversing the rotation of said steering shaft, a winding shaft journaled in said main frame, transmission gearing connecting said winding shaft with said steering shaft, and cables connected with said steering frames and wound on said winding shaft in such manner that when the latter is turned said steering frames will be swiveled in opposite directions.

In testimony whereof I have signed my name to this specification in the presence of two subscribing witnesses.

ROBERT E. ZAGER.

Witnesses:
T. A. KEIMBALL,
T. H. SMITH.